US012707339B2

(12) United States Patent
Godin et al.

(10) Patent No.: US 12,707,339 B2
(45) Date of Patent: Aug. 11, 2026

(54) INTER-REGISTRATION AREA MOBILITY IN RRC INACTIVE STATE

(71) Applicant: Nokia Technologies Oy, Espoo (FI)

(72) Inventors: Philippe Godin, Massy (FR); Halit Murat Gürsu, Munich (DE); Alessio Casati, West Molesey (GB); Ömer Bulakci, Munich (DE); György Tamás Wolfner, Budapest (HU); Muhammad Naseer-Ul-Islam, Munich (DE)

(73) Assignee: Nokia Technologies Oy, Espoo (FI)

(*) Notice: Subject to any disclaimer, the term of this patent is extended or adjusted under 35 U.S.C. 154(b) by 296 days.

(21) Appl. No.: 18/566,267

(22) PCT Filed: Jul. 1, 2021

(86) PCT No.: PCT/EP2021/068119

§ 371 (c)(1),
(2) Date: Dec. 1, 2023

(87) PCT Pub. No.: WO2023/274533

PCT Pub. Date: Jan. 5, 2023

(65) Prior Publication Data

US 2024/0292279 A1 Aug. 29, 2024

(51) Int. Cl.

*H04L 5/00* (2006.01)
*H04W 36/00* (2009.01)
*H04W 76/27* (2018.01)

(52) U.S. Cl.

CPC ........ *H04W 36/0011* (2013.01); *H04W 76/27* (2018.02)

(58) Field of Classification Search

CPC .............. H04W 36/0011; H04W 76/27; H04L 41/0895
USPC .......................................................... 455/436
See application file for complete search history.

(56) References Cited

U.S. PATENT DOCUMENTS

2021/0068073 A1* 3/2021 Sivavakeesar ........ H04W 68/00

FOREIGN PATENT DOCUMENTS

CN 111386727 A 7/2020

OTHER PUBLICATIONS

Slice re-mapping or removal during mobility, 3GPP draft, R3-171143, 3 Mar. 25, 2017, XP051255173 (Year: 2017).*

"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

(Continued)

*Primary Examiner* — Tanmay K Shah
(74) *Attorney, Agent, or Firm* — Harness, Dickey & Pierce P.L.C.

(57) ABSTRACT

An apparatus, comprising at least one processor, and at least one memory storing instructions, the at least one memory and the instructions configured to, with the at least one processor, cause a network node to transmit a first information, which characterizes one or more slices onto which a network allows slices of existing PDU sessions to be re-mapped, to a user equipment.

15 Claims, 4 Drawing Sheets

(56) References Cited

OTHER PUBLICATIONS

"3rd Generation Partnership Project; Technical Specification Group Services and System Aspects; System architecture for the 5G System (5GS), Stage 2 (Release 17)", 3GPP TS 23.501, V17.0.0, Mar. 2021, pp. 1-489.

"3rd Generation Partnership Project; Technical Specification Group Core Network and Terminals; Numbering, addressing and identification; (Release 17)", 3GPP TS 23.003, V17.1.0, Mar. 2021, pp. 1-143.

International Search Report and Written Opinion received for corresponding Patent Cooperation Treaty Application No. PCT/EP2021/068119, dated Mar. 29, 2022, 12 pages.

"Slice re-mapping or removal during mobility", 3GPP TSG-RAN WG3 #95bis, R3-171143, Agenda Item: 10.3, Ericsson, Apr. 3-7, 2017, 5 pages.

* cited by examiner

INTER-REGISTRATION AREA MOBILITY IN RRC INACTIVE STATE

RELATED APPLICATION

This application claims priority to PCT Application No. PCT/EP2021/068119, filed on Jul. 1, 2021, which is incorporated herein by reference in its entirety.

FIELD OF THE DISCLOSURE

Various example embodiments relate to an apparatus comprising at least one processor.

Further embodiments relate to a method of operating related to such apparatus.

BACKGROUND

Wireless communications systems may e.g. be used for wireless exchange of information between two or more entities, e.g. comprising one or more terminal devices, e.g. user equipment, and one or more network devices such as e.g. base stations.

Some wireless communications systems such as, for example, 5G systems may provide a feature referred to as "network slicing" which enables to support different services using a same underlying mobile network infrastructure. Network slices can differ either in their service requirements like Ultra-Reliable Low Latency Communication (URLLC) and enhanced Mobile Broadband (eMBB) or the tenant that provides those services.

In some configurations, network slices may be identified via S-NSSAI (Single-Network Slice Selection Assistance Information). Current 3GPP Generation (Third Partnership Project) specifications allow a user equipment to be simultaneously connected and served by at most eight S-NSSAIs. On the other hand, a cell may support tens or even hundreds of S-NSSAIS, e.g., in some current specifications a tracking area can support up to 1024 network slices.

In some configurations, the S-NSSAI may include both a Slice Service Type (SST) and a Slice Differentiator (SD) field or may include an SST field part. In some conventional systems, the SST field may have standardized and non-standardized values. In some configurations, values 0 to 127 belong to the standardized SST range. For instance, an SST value of "1" may indicate that the slice is suitable for handling of 5G eMBB, "2" for handling of URLLC, etc.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus, comprising at least one processor, and at least one memory storing instructions, the at least one memory and the instructions configured to, with the at least one processor, cause a network node to transmit a first information, which characterizes one or more slices onto which a network allows slices of existing protocol data unit (PDU) sessions to be re-mapped, to a user equipment.

In some embodiments, the apparatus may be an apparatus for a wireless communications system.

In some embodiments, the apparatus or its functionality, respectively, may be provided in a network device, for example network node, of the communications system, for example in a base station, e.g. gNodeB (gNB).

In some embodiments, the apparatus according to the embodiments or its functionality, respectively, may be used for or within wireless communications systems, e.g. networks, based on or at least partially adhering to third generation partnership project, 3GPP, radio standards such as 5G (fifth generation) or other radio access technology.

In some embodiments, the network node may be a last serving node, for example last serving NG-RAN (Next Generation Radio Access Network) node of the user equipment before the user equipment was sent in RRC inactive state.

In some embodiments, the first information may form and/or may be organized in form of a list, which in some embodiments may be called "slice remapping list".

In some embodiments, the first information or slice remapping list may comprise a list providing for each slice "x" of any existing PDU session "y" information on slices, for example a list of slices, onto which the network allows "slice x" to be re-mapped to.

In some embodiments, the slice remapping list may be or may have been configured in the network node. In some other embodiment, the slice remapping list may be or may have been received by the network node from another entity, for example from an access management function (AMF), for example as a part of a PDU Session context or user equipment context when the existing PDU session was earlier setup.

In some conventional approaches, for example during mobility in a radio resource control (RRC) Inactive state, a user equipment may not re-select the right cell to ensure service continuity. For example, when considering a user equipment which has a "PDU session 1" of "slice 1" when sent to RRC Inactive state, further assuming that a network can remap "slice 1" into "slice 2" or "slice 3", during mobility of the user equipment in the RRC Inactive state, at a Registration Area (RA) border, the user equipment may select or re-select a "cell 4" supporting, for example only, "slice 4", so that the service continuity for the "PDU Session 1" may get lost. Indeed, when the user equipment re-connects to "cell 4", a gNB serving "cell 4" may run admission control as specified in some accepted standard and fail the "PDU session 1" given that "slice 1" cannot be re-mapped to "slice 4".

However, there might have been at the RA border another "cell 3" supporting "slice 3". If the user equipment would have selected or re-selected "cell 3" instead of "cell 4", the "PDU session 1" could have been re-mapped to "slice 3" and service could have been continued. In some embodiments, this may be accomplished, e.g. service continuity may be maintained even if a user equipment moves during an RRC Inactive state outside its registration area, using slice re-mapping based on the first information.

As an example, returning to the exemplary scenario discussed in the preceding paragraphs, when the user equipment has knowledge of the first information (e.g., provided by transmission of the first information to the user equipment), the user equipment may exploit this knowledge to maintain service continuity, for example by selecting or re-selecting a suitable new cell (in the present example: "cell 3") based on the first information.

In some embodiments, the instructions, when executed by the at least one processor, cause the network node to evaluate a condition which characterizes whether the network node should transmit the first information to the user equipment, and to transmit the first information based on the evaluation.

In some embodiments, the condition characterizes whether a radio access network notification area, RNA, of the user equipment in RRC Inactive state has at least one neighboring cell belonging to an external tracking area, wherein for example the external tracking area is external to a current registration area of the user equipment.

In some embodiments, the network node may evaluate the condition, for example, by determining whether the radio access network notification area of the user equipment has at least one neighboring cell belonging to an external tracking area, and, if so, the network node may transmit the first information.

In some embodiments, the network node may evaluate the condition, for example, by determining whether the radio access network notification area of the user equipment has at least one neighboring cell belonging to an external tracking area, and, if not, the network node may not transmit the first information.

In some embodiments, the instructions, when executed by the at least one processor, cause the network node to transmit the first information in a radio resource control, RRC, Release message. In some embodiments, the RRC Release message may be used by the network node to send the user equipment into an RRC_INACTIVE state.

In some embodiments, the instructions, when executed by the at least one processor, cause the network node to determine slices characterized by the first information that are not supported by any cell neighboring a radio access network notification area, RNA, of the user equipment and that belong to an external tracking area. In some embodiments, this enables to filter out such slices which the network node, e.g. last serving NG-RAN node, can identify as not supported by the cells neighboring the RNA and belonging to an external tracking area.

In some embodiments, the instructions, when executed by the at least one processor, cause the network node to remove the determined slices, e.g. from the first information, for example embodied by a slice re-mapping list.

Further embodiments relate to an apparatus, comprising at least one processor, and at least one memory storing instructions, the at least one memory and the instructions configured to, with the at least one processor, cause a user equipment to receive a first information, which characterizes one or more slices onto which a network allows slices of existing PDU sessions to be re-mapped, from a network device.

In some embodiments, the user equipment may receive the first information from the network device together with or within, e.g. embedded in, an RRC Release message. In some embodiments, the RRC Release message may be used by the network device to send the user equipment into an RRC_INACTIVE state.

In some embodiments, the instructions, when executed by the at least one processor, cause the user equipment to perform a cell selection or re-selection based on the first information.

Further embodiments relate to a method comprising: transmitting, by a network node, a first information, which characterizes one or more slices onto which a network allows slices of existing PDU sessions to be re-mapped, to a user equipment.

Further embodiments relate to a method comprising: receiving, by a user equipment, first information, which characterizes one or more slices onto which a network allows slices of existing PDU sessions to be re-mapped, from a network device.

Further embodiments relate to an apparatus comprising means for transmitting a first information, which characterizes one or more slices onto which a network allows slices of existing PDU sessions to be re-mapped, to a user equipment. In some embodiments, the means for transmitting the first information may e.g. comprise at least one processor, and at least one memory storing instructions, the at least one memory and the instructions configured to, with the at least one processor, perform said steps.

Further embodiments relate to an apparatus comprising means for receiving first information, which characterizes one or more slices onto which a network allows slices of existing PDU sessions to be re-mapped, from a network device. In some embodiments, the means for receiving the first information may e.g. comprise at least one processor, and at least one memory storing instructions, the at least one memory and the instructions configured to, with the at least one processor, perform said steps.

Further embodiments relate to a communications system comprising at least one apparatus according to the embodiments.

Further embodiments relate to a computer program comprising instructions which, when the program is executed by a computer, cause the computer to carry out the method according to the embodiments.

In some embodiments, the computer program may be stored on a non-transitory computer readable storage medium.

Further embodiments relate to a data carrier signal carrying the computer program according to the embodiments.

Further embodiments relate to a use of the apparatus according to the embodiments and/or of the method according to the embodiments and/or of the computer program according to the embodiments and/or of the data carrier signal according to the embodiments for at least one of: a) providing user equipment with information related to slices onto which a network allows slices of existing PDU sessions to be re-mapped, b) ensuring service continuity, e.g. associated with PDU sessions.

DESCRIPTION OF SOME EXEMPLARY EMBODIMENTS

Figure 1:
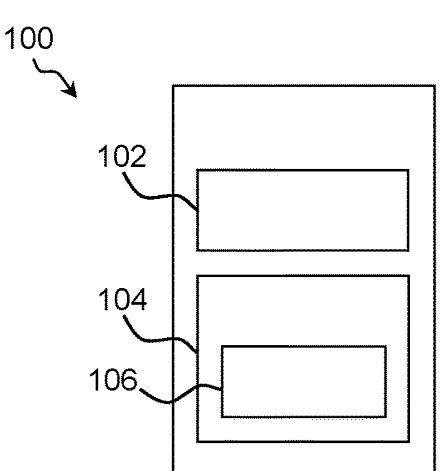
FIG. 1 schematically depicts a simplified block diagram of an apparatus according to some embodiments, FIG. 2 schematically depicts a simplified block diagram of an apparatus according to some embodiments, FIG. 3 schematically depicts a simplified block diagram according to some embodiments, FIG. 4 schematically depicts a simplified flow chart according to some embodiments, FIG. 5 schematically depicts a simplified flow chart according to some embodiments, FIG. 6 schematically depicts a simplified flow chart according to some embodiments, FIG. 7 schematically depicts a simplified signalling diagram according to some embodiments, FIG. 8 schematically depicts a simplified block diagram according to some embodiments, FIG. 9 schematically depicts a simplified block diagram according to some embodiments.
Figure 2:
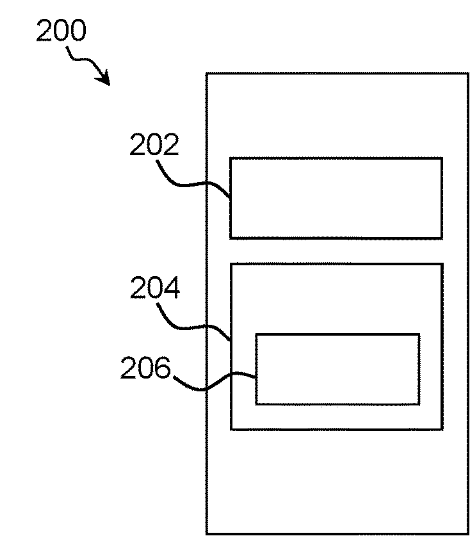
Figure 3:
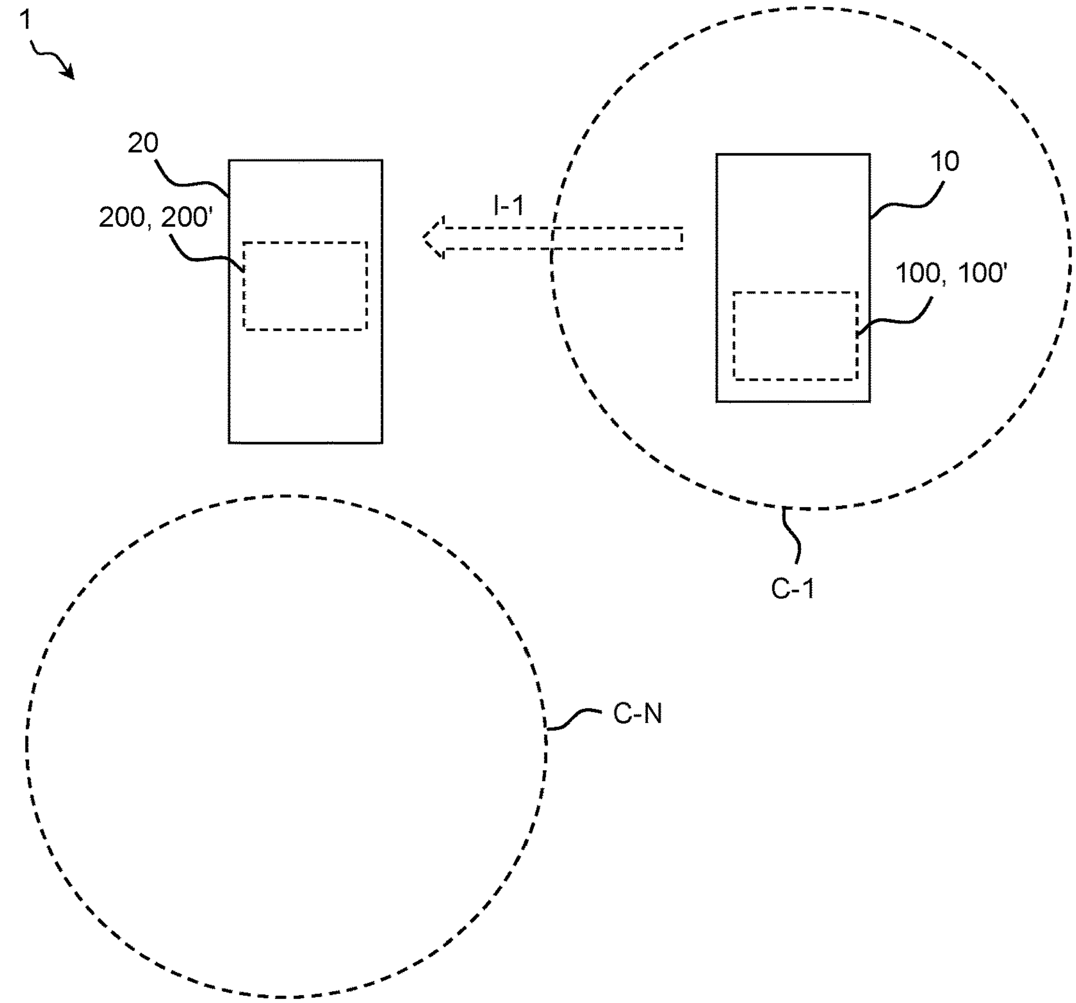
Figure 4:
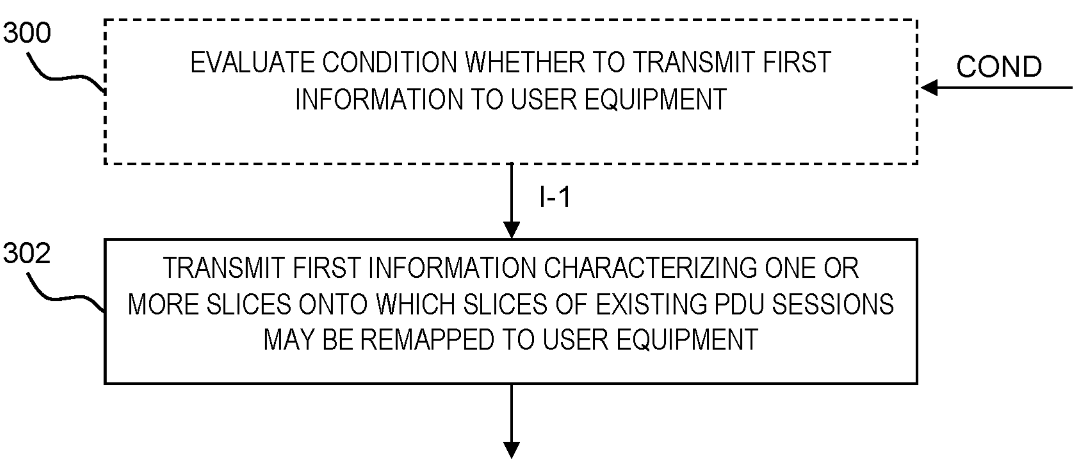

Some embodiments, see for example FIG. 1, 3, 4, relate to an apparatus 100 (FIG. 1), comprising at least one processor 102, and at least one memory 104 storing instructions 106, the at least one memory 104 and the instructions 106 configured to, with the at least one processor 102, cause a network node 10 (FIG. 3) to transmit 302 (FIG. 4) a first information I-1, which characterizes one or more slices onto which a network allows slices of existing protocol data unit (PDU) sessions to be re-mapped, to a user equipment 20 (FIG. 2).

In some embodiments, the apparatus 100 may be an apparatus for a wireless communications system 1 (FIG. 3).

In some embodiments, the apparatus 100 or its functionality, respectively, may be provided in a network device, for example network node 10, of the communications system 1, for example in a base station 10, e.g. gNodeB (gNB).

In some embodiments, the apparatus 100 according to the embodiments or its functionality, respectively, may be used for or within wireless communications systems 1, e.g. networks, based on or at least partially adhering to third generation partnership project, 3GPP, radio standards such as 5G (fifth generation) or other radio access technology.

In some embodiments, the network node 10 (FIG. 3) may be a last serving node before moving the user equipment to RRC Inactive state, for example NG-RAN (Next Generation Radio Access Network) node 10 of the user equipment 20.

In some embodiments, the first information I-1 may form and/or may be organized in form of a list, which in some embodiments may be called "slice remapping list".

In some embodiments, the first information I-1 or slice remapping list may comprise a list providing for each slice "x" of any existing PDU session "y" information on slices, for example a list of slices, onto which the network allows "slice x" to be re-mapped to.

In some conventional approaches, for example during mobility in a radio resource control (RRC) Inactive state, a user equipment may not re-select the right cell to ensure service continuity. For example, when considering a user equipment which has a "PDU session 1" of "slice 1" when sent to RRC Inactive state, further assuming that a network can remap "slice 1" into "slice 2" or "slice 3", during mobility of the user equipment in the RRC Inactive state, at a Registration Area (RA) border, the user equipment may re-select a "cell 4" supporting, for example only, "slice 4", so that the service continuity for the "PDU Session 1" may get lost. Indeed, when the user equipment re-connects to "cell 4", a gNB serving "cell 4" may run admission control as specified in some accepted standard and fail the "PDU session 1" given that "slice 1" cannot be re-mapped to "slice 4".

However, there might have been at the RA border another "cell 3" supporting "slice 3". If the user equipment would have re-selected "cell 3" instead of "cell 4", the "PDU session 1" could have been re-mapped to "slice 3" and service could have been continued. In some embodiments, this may be accomplished, e.g. service continuity may be maintained even if a user equipment 20 (FIG. 3) moves during an RRC Inactive state outside its registration area, using slice re-mapping based on the first information I-1.

As an example, returning to the exemplary scenario discussed in the preceding paragraphs, when the user equipment 20 (FIG. 3) has knowledge of the first information I-1 (e.g., provided by transmission 302 of the first information I-1 to the user equipment 20), the user equipment 20 may exploit this knowledge to maintain service continuity, for example by selecting or re-selecting a suitable new cell (in the present example: "cell 3") based on the first information I-1.

In some embodiments, FIG. 4, the instructions 106, when executed by the at least one processor 102, cause the network node 10 to evaluate 300 a condition COND which characterizes whether the network node 10 should transmit the first information I-1 to the user equipment 20, and to transmit 302 the first information I-1 based on the evaluation 300.

In some embodiments, the condition COND characterizes whether a radio access network notification area, RNA, of the user equipment 20 in RRC inactive state has at least one neighboring cell C—N(FIG. 3) belonging to an external tracking area, wherein for example the external tracking area is external to a current registration area of the user equipment 20.

In some embodiments, the network node 10 may evaluate 300 (FIG. 4) the condition COND, for example, by determining whether the radio access network notification area of the user equipment 20 has at least one neighboring cell belonging to an external tracking area, and, if so, the network node 10 may transmit 302 the first information I-1.

In some embodiments, the network node 10 may evaluate 300 the condition COND, for example, by determining whether the radio access network notification area of the user equipment has at least one neighboring cell belonging to an external tracking area, and, if not, the network node 10 may not transmit the first information I-1.

In some embodiments, the instructions 106, when executed by the at least one processor 102, cause the network node 10 to transmit 302 the first information I-1 in a radio resource control, RRC, Release message (also see element e3 of FIG. 7 explained further below). In some embodiments, the RRC Release message e3 may be used by the network node 10 to send the user equipment 20 into an RRC_INACTIVE state.

Figure 5:
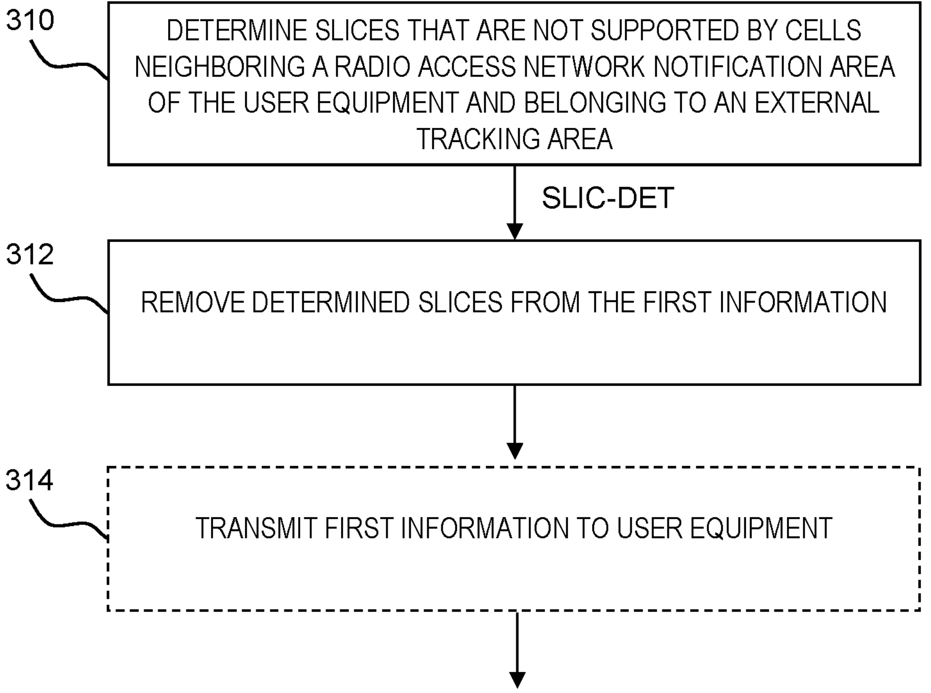

In some embodiments, FIG. 5, the instructions 106, when executed by the at least one processor 102, cause the network node 10 to determine 310 slices SLIC-DET characterized by the first information I-1 that are not supported by any cell C—N(FIG. 3) neighboring a radio access network notification area, RNA, of the user equipment 20 in RRC inactive state and that belong to an external tracking area.

In some embodiments, this enables to filter out such slices which the network node 10, e.g. last serving NG-RAN node, can identify as not supported by the cells neighboring the RNA and belonging to an external tracking area.

In some embodiments, the instructions 106, when executed by the at least one processor 102, cause the network node 10 to remove 312 (FIG. 5) the determined slices SLIC-DET, e.g. from the first information I-1, for example embodied by a slice re-mapping list.

Figure 6:
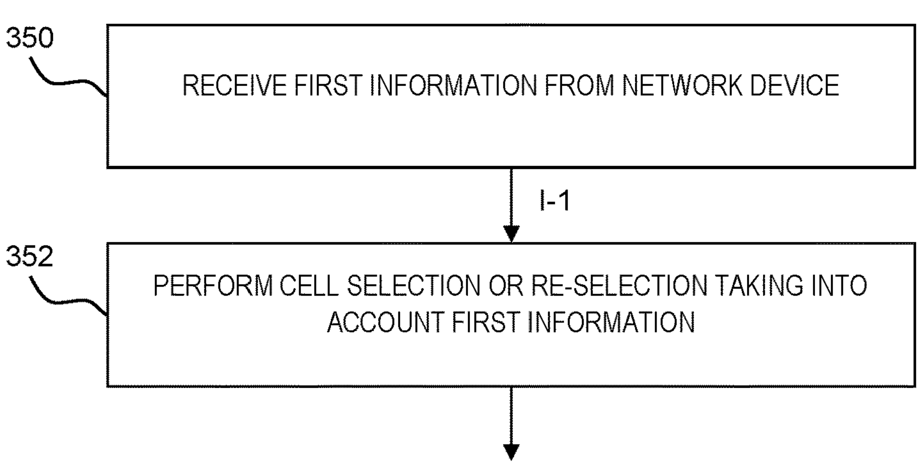

Further embodiments, see for example FIG. 2, 3, 6 relate to an apparatus 200, comprising at least one processor 202, and at least one memory 204 storing instructions 206, the at least one memory 204 and the instructions 206 configured to, with the at least one processor 202, cause a user equipment 20 (FIG. 3) to receive 350 (FIG. 6) a first information I-1, which characterizes one or more slices onto which a network allows slices of existing PDU sessions to be re-mapped, from a network device 10.

Figure 7:
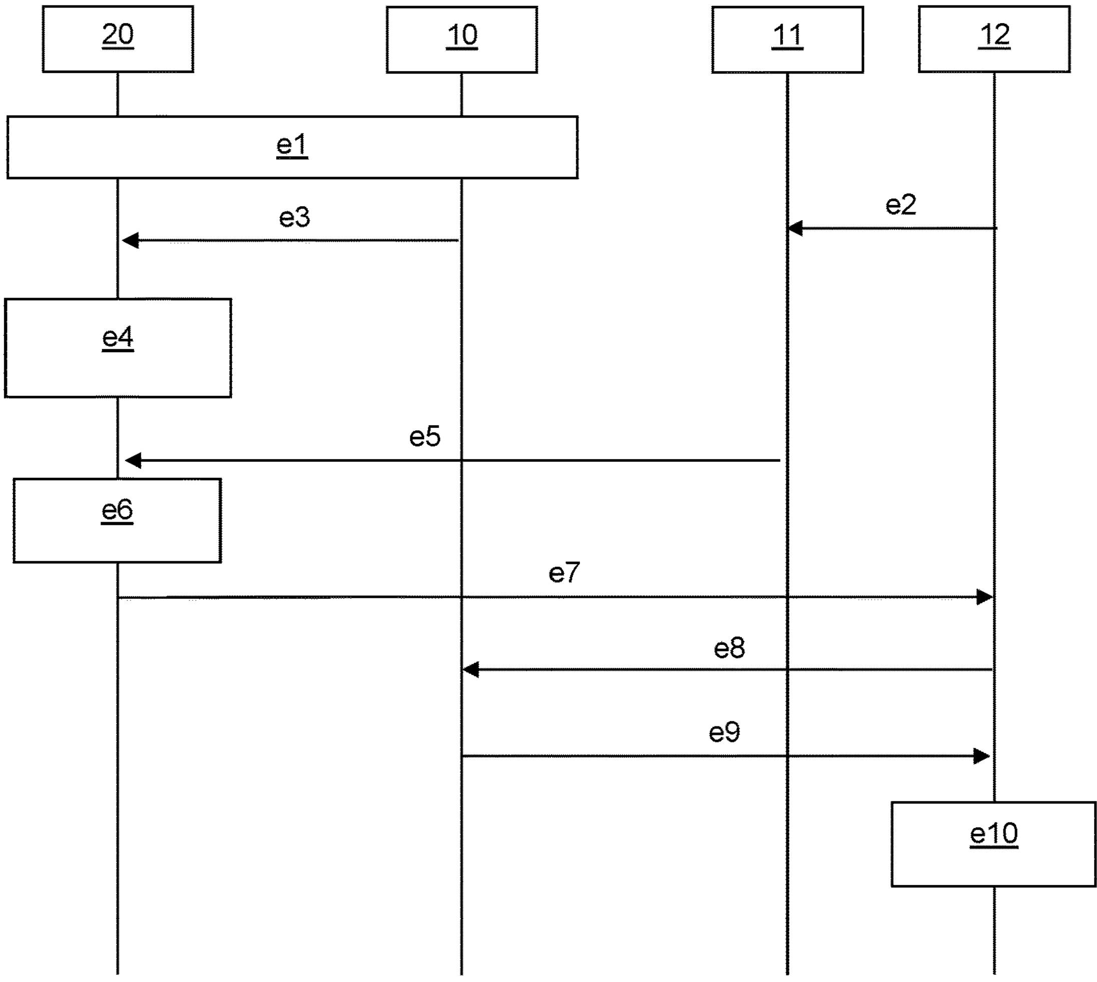

In some embodiments, the user equipment 20 may receive 350 the first information I-1 from the network device 10 together with or within, e.g. embedded in, an RRC Release message e3 (FIG. 7). In some embodiments, the RRC Release message e3 may be used by the network device 10 to send the user equipment 20 into an RRC_INACTIVE state.

In some embodiments, the instructions 206, when executed by the at least one processor 202, cause the user equipment 20 to perform 352 a cell selection or cell re-selection taking into account the first information I-1, e.g. among other criteria.

Further embodiments, FIG. 4, relate to a method comprising: transmitting 302, by a network node 10, a first information I-1, which characterizes one or more slices onto which a network allows slices of existing PDU sessions to be re-mapped, to a user equipment 20.

Further embodiments, FIG. 6, relate to a method comprising: receiving 350, by a user equipment 20, first information I-1, which characterizes one or more slices onto which a network allows slices of existing PDU sessions to be re-mapped, from a network device 10.

FIG. 7 schematically depicts a simplified signalling diagram according to some embodiments. Element 10 symbolizes a network node, e.g. last serving gNB, which is for example associated with a first tracking area "TA1". Element 20 symbolizes a user equipment served by the gNB 10. Element 11 symbolizes a further gNB, e.g. associated with a cell 5 of an RNA neighbouring RA border, and element 12 symbolizes a further gNB, e.g. associated with a cell 3, a further tracking area "TA3" and slice 3.

Element e1 symbolizes that the user equipment 20 has an existing PDU session 1 of slice 1 in an RRC Connected mode with the (last) serving gNB 20.

Element e2 symbolizes an Xn Setup message from gNB 12 to gNB 11, e.g. associated with cell 3 and slice 3.

Element e3 symbolizes an RRC Release message sent from the last serving gNB 10 to the user equipment 20, together with the first information I-1. In some embodiments, the first information I-1 may represent a slice remapping list for existing slices, e.g. characterizing a remapping from slice 1 to slices 2, 3.

In some embodiments, the serving gNB 10 may decide to send to the user equipment 20 the RRC Release message e3, e.g. with suspend indication and configured RNA. In some embodiments, the serving gNB 10 may add the slice remapping list I-1 which may presently for example indicate that the network 1 (FIG. 3) can remap slice 1 into slice 2 or into slice 3. Element e4 symbolizes the user equipment 20 transitioning into an RRC_INACTIVE state, e.g. in response to the message e3. In some embodiments, the user equipment 20 moves within the RNA and reaches the RNA border which may also be the RA border at cell 5 which is still within the RNA and RA. In some embodiments, the user equipment 20 considers candidate cells 3 and 4 for re-selection outside the RA.

In some embodiments, the user equipment 20 may learn from information e5 broadcast in cell 5 (associated with gNB 11) that the cells 3 and 4, which are neighboring cell 5 outside the RA, respectively support slice 3 and slice 4. In some embodiments, the gNB 11 of cell 5 may have for example learnt this from earlier received Xn Setup messages from gNB 12 of cell 3 and gNB of cell 4.

In some embodiments, see element e6, the user equipment 20 re-selects cell 3 taking into account, for example among other criteria, the first information I-1 or slice remapping list received with message e3 and sends a RRC resume request for RNA/RA update towards qNB 12 of cell 3, see element e7.

In some embodiments, see for example elements e8, e9, the gNB 12 of cell 3 fetches the context from the last serving gNB 10 and recovers the PDU session 1 of slice 1 which it continues, see element e10, through re-mapping of this PDU session 1 into slice 3.

Figure 8:
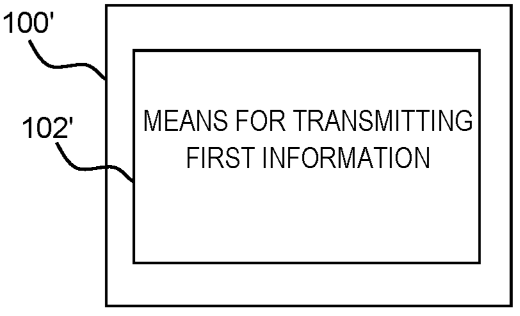

Further embodiments, see FIG. 8, relate to an apparatus 100' comprising means 102' for transmitting a first information I-1, which characterizes one or more slices onto which a network allows slices of existing PDU sessions to be re-mapped, to a user equipment 20. In some embodiments, the means 102' for transmitting the first information I-1 may e.g. comprise at least one processor 102 (FIG. 1), and at least one memory 104 storing instructions 106, the at least one memory 104 and the instructions 106 configured to, with the at least one processor 102, perform said steps.

Figure 9:
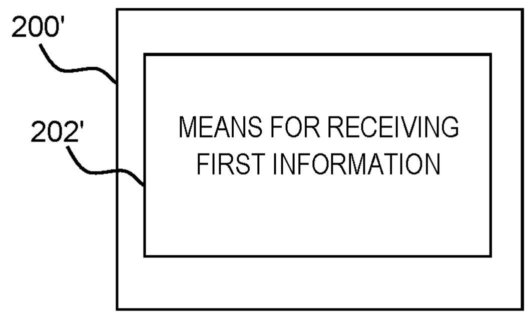

Further embodiments, FIG. 9, relate to an apparatus 200', comprising means 202', for receiving first information I-1, which characterizes one or more slices onto which a network allows slices of existing PDU sessions to be re-mapped, from a network device 10. In some embodiments, the means 202' for receiving the first information I-1 may e.g. comprise at least one processor 202 (FIG. 2), and at least one memory 204 storing instructions 206, the at least one memory 204 and the instructions 206 configured to, with the at least one processor 202, perform said steps.

Further embodiments relate to a communications system 1 (FIG. 3) comprising at least one apparatus 100, 100', 200, 200' according to the embodiments.

Further embodiments relate to a computer program comprising instructions 106, 206 which, when the program is executed by a computer (e.g., represented by a combination of the components 102, 104; 202, 204), cause the computer to carry out the method according to the embodiments.

In some embodiments, the computer program may be stored on a non-transitory computer readable storage medium such as a harddisk or compact disc.

Further embodiments relate to a data carrier signal carrying the computer program according to the embodiments.

Further embodiments relate to a use of the apparatus according to the embodiments and/or of the method according to the embodiments and/or of the computer program according to the embodiments and/or of the data carrier signal according to the embodiments for at least one of: a) providing user equipment 20 with information I-1 related to slices onto which a network allows slices of existing PDU sessions to be re-mapped, b) ensuring service continuity, e.g. associated with PDU sessions.

The invention claimed is:

1. An apparatus, comprising at least one processor, and at least one memory storing instructions, the at least one memory and the instructions configured to, with the at least one processor, cause a network node to transmit a first information which characterizes one or more slices onto which a network allows slices of existing PDU sessions to be re-mapped, to a user equipment.

2. The apparatus according to claim 1, wherein the instructions when executed by the at least one processor, cause the network node to evaluate a condition which characterizes whether the network node should transmit the first information to the user equipment, and to transmit the first information based on the evaluation.

3. The apparatus according to claim 1, wherein the condition characterizes whether a radio access network notification area, RNA, of the user equipment in RRC inactive state has at least one neighboring cell belonging to an external tracking area, wherein for example the external tracking area is external to a current registration area of the user equipment.

4. The apparatus according to claim 1, wherein the instructions when executed by the at least one processor, cause the network node to transmit the first information in a radio resource control, RRC, Release message.

5. The apparatus according to claim 4, wherein the instructions, when executed by the at least one processor, cause the network node to transmit the first information in a radio resource control, RRC, Release message sending the user equipment to RRCE inactive state.

6. The apparatus according to claim 1, wherein the instructions, when executed by the at least one processor, cause the network node to determine slices characterized by the first information that are not supported by any cell neighboring a radio access network notification area, RNA, of the user equipment in RRC inactive state and that belong to an external tracking area.

7. The apparatus according to claim 6, wherein the instructions when executed by the at least one processor, cause the network node to remove the determined slices from the first information.

8. An apparatus, comprising at least one processor, and at least one memory storing instructions, the at least one memory and the instructions configured to, with the at least one processor, cause a user equipment to receive a first information, which characterizes one or more slices onto which a network allows slices of existing PDU sessions to be re-mapped, from a network device.

9. The apparatus according to claim 8, wherein the instructions, when executed by the at least one processor, cause the user equipment to perform a cell selection or cell re-selection taking into account the first information.

10. A method comprising; transmitting, by a network node, a first information, which characterizes one or more slices onto which a network allows slices of existing PDU session to be re-mapped, to a user equipment.

11. A method comprising; receiving, by a user equipment, first information, which characterizes one or more slices onto which a network allows slices of existing PDU sessions to be re-mapped, from a network device.

12. The apparatus according to claim 8, wherein the slices characterized by the first information are at least one of, supported by a cell neighboring a radio access network notification area, RNA, of the user equipment in RCC inactive state, or belong to a current registration area of the user equipment.

13. The method according to claim 10, further comprising determining, by the network node, slices characterized by the first information that are not supported by any cell neighboring a radio access network notification area, RNA, of the user equipment in RRC inactive state and that belong to an external tracking area.

14. The method according to claim 13, further comprising removing, by the network node, the determined slices from the first information.

15. The method according to claim 11 wherein the slices characterized by the first information are at least one of, supported by a cell neighboring a radio access network notification area, RNA, of the user equipment in RCC inactive state, or belong to a current registration area of the user equipment.

* * * * *